US007558719B1

(12) United States Patent
Donlin

(10) Patent No.: US 7,558,719 B1
(45) Date of Patent: Jul. 7, 2009

(54) SYSTEM AND METHOD FOR RUNTIME ANALYSIS OF SYSTEM MODELS FOR VARIABLE FIDELITY PERFORMANCE ANALYSIS

(75) Inventor: Adam P. Donlin, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 482 days.

(21) Appl. No.: 11/106,337

(22) Filed: Apr. 14, 2005

(51) Int. Cl.
*G06F 17/50* (2006.01)
(52) U.S. Cl. ............................................ 703/14; 716/4
(58) Field of Classification Search ................... 703/13, 703/14, 16, 17; 716/2, 4
See application file for complete search history.

(56) References Cited

U.S. PATENT DOCUMENTS

| | | | |
|---|---|---|---|
| 6,681,387 B1 | 1/2004 | Hwu et al. | |
| 7,183,799 B1 * | 2/2007 | Donlin et al. | 326/38 |

OTHER PUBLICATIONS

Smith et al., J. Polynomial Circuit Models for Component Matching in High-Level Synthesis, IEEE Transactions on Very Large Scale Integration (VLSI) Systems, Dec. 2001, pp. 783-800.*
Gines et al., A. A Mixed-Signal Design Reuse Methodology Based on Parametric Behavioural Models with Non-Ideal Effects, Design, Automation and Test in Europe Conf. and Exhibition, Mar. 2002, pp. 310-314.*
Sklyarov et al., V. Design Tools and Reusable Libraries for FPGA-Based Circuits, Euromicro Symposium on Digital System Design, Sep. 2003, pp. 255-263.*
Bhattacharya et al., S. A Mask Reuse Methodology for Reducing System-on-a-Chip Cost, IEEE 6th Int. Symposium on Quality of Electronic Design, Mar. 2005, pp. 482-487.*
Dhananjai Madhava Rao et al.; "Dynamic Component Substitution in Web-Based Simulation"; Proceedings of the 2000 Winter Simulation Conference; pp. 1840-1848.
Lijun Li et al.; "DVS: An Object-Oriented Framework for Distributed Verilog Simulation"; Proceedings of the Seventeenth Workshop on Parallel and Distributed Simulation (PADS'03); Copyright 2003 IEEE; pp. 1-8.
Thomas Ball et al.; "Optimally Profiling and Tracking Programs"; Appears in ACM Transactions on Programming Languages and Systems; Jul. 1994; Copyright 1994 by Association for Computing Machinery, Inc.; pp. 1-38.
Dhananjai M. Rao et al.; "Performance Prediction of Dynamic Component Substitutions"; Proceedings of the 2002 Winter Simulation Conference; pp. 816-824.
Antti Pelkonen et al.; "System-Level Modeling of Dynamically Reconfigurable Hardware with SystemC"; Copyright 2003 IEEE; Proceedings of the International Parallel and Distributed Processing Symposium (IPDPS'03).

(Continued)

*Primary Examiner*—Russell Frejd
(74) *Attorney, Agent, or Firm*—Marc Ascolese; Michael R. Hardaway; Kevin T. Cuenot

(57) ABSTRACT

Systems, methods, software, and techniques can be used to provide and monitor simulation environments including one or more model components. A particular model component can have multiple different versions of the model component having varying levels of abstraction. Executing model components are monitored, and depending on certain performance characteristics, a model component can be replaced with a different version of that model component.

19 Claims, 4 Drawing Sheets

OTHER PUBLICATIONS

Preeti Ranjan Panda; "SystemC—A Modeling Platform Supporting Multiple Design Abstractions"; Copyright 2001 ACM; Oct. 1-3, 2001; ISSS'01; pp. 1-6.

Anand Natrajan et al.; "Concurrent Representations for Jointly-executing Models"; Technical Report No. CS-2001-20; Jul. 27, 2001; pp. 1-9.

* cited by examiner

SYSTEM AND METHOD FOR RUNTIME ANALYSIS OF SYSTEM MODELS FOR VARIABLE FIDELITY PERFORMANCE ANALYSIS

TECHNICAL FIELD

The present invention relates to techniques for simulation of integrated circuit designs.

BACKGROUND

As integrated circuit technology continues to advance, system-level designers are finding that in many cases they can implement most or all of particular system on a single integrated circuit. For example, numerous different functional blocks along with peripherals formerly attached to a processor at the card level are integrated onto the same die as the processor. Thus, a great deal of effort has been put into the development of system-on-chip (SoC) design methodologies, architectures, design tools, and fabrication techniques. Since SoCs are integrated circuits that combine the major functional elements of a complete end-product into a single chip using intellectual property (IP) blocks, they enable products with a broad and growing diversity of applications (e.g., communication networks, storage networks, set-top boxes, games, embedded devices, etc.) to be realized with higher performance and lower cost.

Many SoC solutions used in applications today are designed as custom integrated circuits, each with its own internal architecture and perhaps specialized software. Logical units within such an integrated circuit are often difficult to extract and reuse in different applications. Consequently, the same function is often redesigned from one application to the next. Consequently, to promote efficient SoC design and reuse, a variety of strategies are used. Since a typical SoC contains numerous functional blocks representing a very large number of logic gates, such designs can be realized through a macro-based approach targeting one or more specific hardware platforms, e.g., specific field programmable gate arrays (FPGAs), or specialized IP core libraries designed to be easily implemented in existing semiconductor fabrication processes. Macro-based design provides numerous benefits during logic entry and verification, and greatly facilitates IP reuse. From generic I/O ports to complex memory controllers and processor cores, each SoC typically uses many of these common macros.

While SoC design offers many advantages, there are still the familiar challenges of designing a complex system, now on a chip. For example, because of increasing design complexity, system architects are often encouraged to explore more and more of their system's performance and behavior in system-level modeling environments. The fidelity of the data obtained from simulating a model depends on the degree of accuracy to which it was modeled. Typically, designers must trade off the extra effort required to create a detailed (low level of abstraction) model and also the extra computational effort required to simulate the detailed model against the level of fidelity in the performance data recovered from it.

Consequently, it is common in the system level design community to suggest creating multiple models of the same system. The system architect selects which aspects of the system to emphasize and can use different formalisms to capture the system model in simulatable form more quickly. Generally speaking, any single model will operate at a single, predefined level of detail. Hybrid models that combine elements of the system described at different levels of detail have been proposed, but once the levels of detail have been selected, they remain fixed for at least the runtime of the model and, commonly, for the duration of the model's existence.

Accordingly, it is desirable to have integrated circuit modeling tools and techniques, and particularly system level modeling tools and techniques, that allow users the flexibility to vary the level of detail for various model components during simulation.

SUMMARY

It has been discovered that systems, methods, software, and techniques can be used to provide and monitor simulation environments including one or more model components. In one exemplary embodiment of the present invention a particular model component can have multiple different versions of the model component having varying levels of abstraction, wherein executing model components are monitored, and depending on certain performance characteristics, a model component can be replaced with a different version of that model component to improve overall simulation performance.

Another embodiment of the present invention provides a method. A model component corresponding to a simulation task is provided. The model component is executed as part of the simulation task. A performance characteristic of the model component is monitored. At least one of the model component and another executing model component is selectively replaced with a replacement model component according to the monitoring of the performance characteristic of the model component.

Another aspect of the present invention provides a system including a memory, a processor coupled to the memory, and a modular simulation tool. At least a portion of the modular simulation tool is encoded as instructions stored in the memory and executable on the processor. The modular simulation tool is configured to monitor a performance characteristic of a model component. The modular simulation tool is also configured to selectively replace at least one of the model component and another executing model component with a replacement model component based on the monitored performance characteristic of the model component.

Another aspect of the present invention provides an apparatus including: a means for executing a model component as part of a simulation task; a means for monitoring a performance characteristic of the model component; and a means for selectively replacing at least one of the model component and another executing model component with a replacement model component according to the monitoring of the performance characteristic of the model component.

The foregoing is a summary and thus contains, by necessity, simplifications, generalizations and omissions of detail; consequently, those skilled in the art will appreciate that the summary is illustrative only and is not intended to be in any way limiting. As will also be apparent to one skilled in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
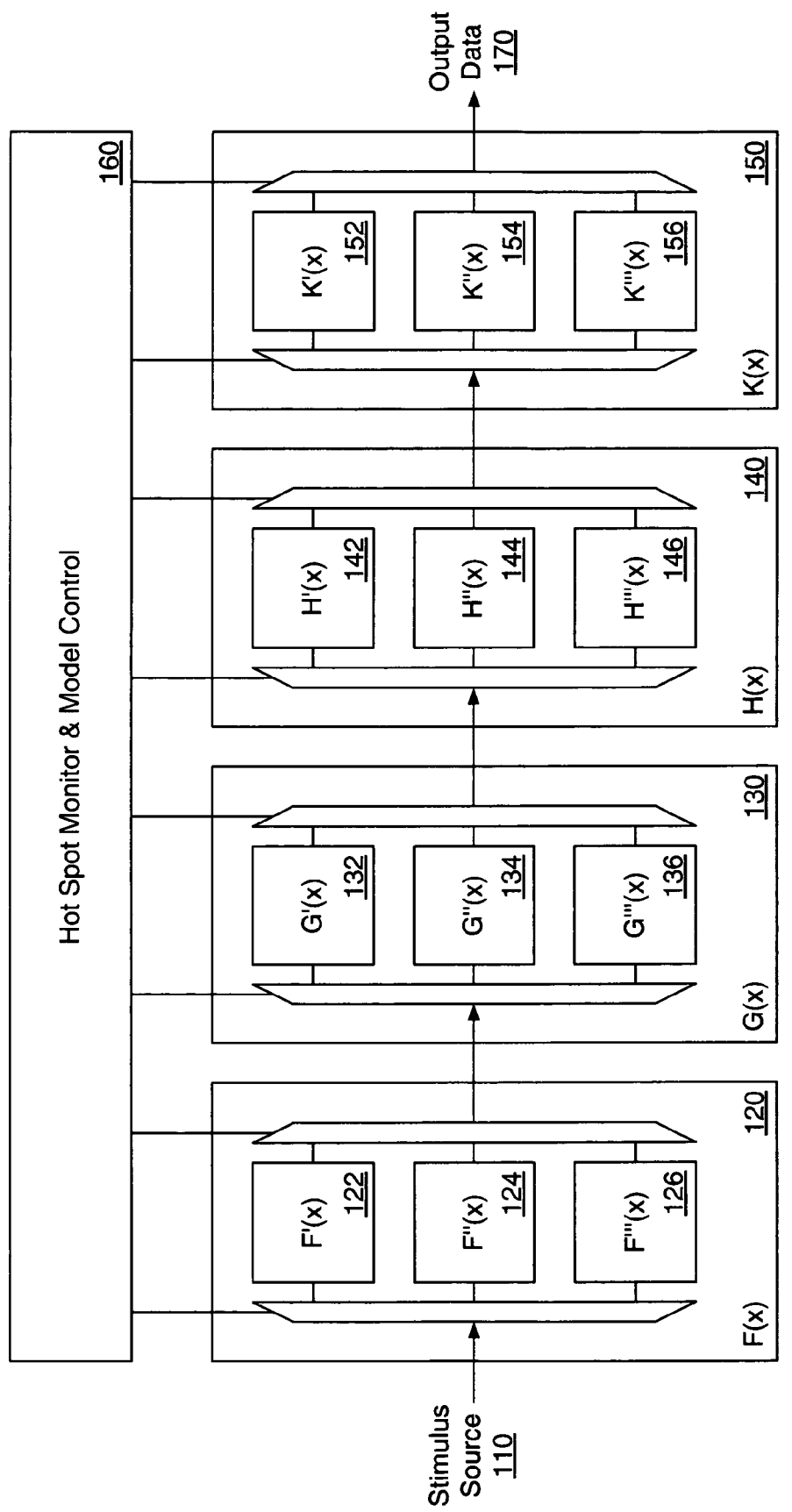
FIG. 1 is a simplified block diagram illustrating a modeling environment for use in system level design of integrated circuits.

FIG. 1 is a simplified block diagram illustrating a modeling environment for use in system level design of integrated circuits, and particularly SoC devices. Although the examples described in the present application will emphasize modeling in association with system level design activities, it should be understood that the tools and techniques described herein can be applied to numerous different circuit design activities and various different types of simulation (i.e., not merely simulation related to integrated circuit design). Similarly, the tools and techniques of the present application are not limited to use with certain types of integrated circuit platforms (e.g., FPGAs or ASICs), but can be used in the design flow for numerous analog, digital, and mixed signal integrated circuits.

Modular simulation tool 100 performs system level design simulation using model components 120-150. Each of the constituent model components 120-150 of the model have themselves been modeled to multiple levels of detail, as represented by the various model subcomponents illustrated. For example, model component 120, which is illustrated as representing the arbitrary function F(x), includes three model subcomponents 122-126. Note that F(x), G(x), H(x), K(x), etc. are arbitrary labels, and the calculations performed by each model component/subcomponent can be functions of multiple variables or indeed more complex calculations of multiple functions, etc. Each of the model subcomponents 122-126 is itself a representation of the F(x) model, albeit at a level of abstraction or modeling detail different from the other two. Thus, model subcomponent 122 represents a lower detail (lower fidelity, higher level of abstraction) model F'(x) of the F(x) functionality. Model subcomponent 124 represents a higher detail (higher fidelity, lower level of abstraction) model F"(x) of the F(x) functionality. Model subcomponent 126 represents the highest detail of the three subcomponents (highest fidelity, lowest level of abstraction) model F'''(x).

As illustrated in FIG. 1, each of the other model components 130, 140, and 150 respectively have three model subcomponents 132-136, 142-146, and 152-156. Moreover, the distinction between a model component and a model subcomponent is arbitrary. Model component 120 does not require two or more of model subcomponents 122, 124, and 126 to operate together at the same time. In general, only one model subcomponent is executed at any one time, i.e., only one of F'(x), F"(x), and F'''(x) "represents" the F(x) model component. Thus, at any given time, one of model subcomponents 122, 124, and 126 is used as model component 120. In some embodiments, more than one model subcomponent for a particular model component executes at a time (e.g., to facilitate the swapping of model subcomponents), but the results from the execution of only one model subcomponent are used by tool 100 at a given time.

Although each of model components 120-150 is illustrated as having three model subcomponents, this need not be the case. Some model components may have more available model subcomponents, while others may have only two or even no subcomponents, i.e., there is only one model component representative of a particular functionality. In other examples, a model subcomponent might itself be formed from one set of several available sets of components. Similarly, modular simulation tool 100 is shown as having four model components, but in general any number of model components can be used. Numerous other variations will be understood by those having ordinary skill in the art, and throughout the remainder of the application, the term "model component" will generally be used to refer to any portion of a model (e.g., a model component without any subcomponents, a subcomponent of a model, etc.) that provides an adequately compartmentalized portion of the overall model.

Modular simulation tool 100 has at its disposal two or more functionally equivalent (or at least substantially functionally equivalent) model components for any one aspect of the simulation. Hot spot monitor & model control 160 (described in greater detail below) is used to monitor, select, and control the model components that are used by tool 100 at a given time during the simulation. Modular simulation tool 100 thereby provides a mechanism for dynamically varying the level of model detail during the simulation of a system model.

Model component control is schematically illustrated in FIG. 1 via hot spot monitor & model control 160's selection of the various multiplexers in model components 120-150. The modeling formalism and simulator allow the dynamic substitution of one model component for another. A simple means of achieving this is to instantiate every instance of the model component and selectively redirect the data exchanged between different component instances. Thus, in some embodiments, multiple model subcomponents for the same model component execute at the same time. In those embodiments, hot spot monitor & model control 160 controls data flow to and/or from the desired model subcomponent. The multiplexers shown in FIG. 1 merely illustrate the functionality of directing data to/from desired model subcomponents. In other embodiments, only one model component executes at a time, and so switching model components involves ending one or more processes or threads corresponding to one model component and executing one or more processes or threads corresponding to the replacement model component. Here again, the multiplexers shown in FIG. 1 merely illustrate the possible functionalities used to affect this change.

Modular simulation tool 100 is shown implementing a pipelined simulation architecture. Stimulus source 110 (e.g., initial data values, a continuous data stream, test vectors, etc.) provides data to model component 120, which simulates the function F(x) using the data. Simulation results are passed to the next model component in the pipeline (130) and so on down the line producing output data 170. Analysis by and control signals from hot spot monitor & model control 160 will generally determine which model component is used to represent the function being simulated at each stage. Although a pipeline architecture is shown, various other architectures can be simulated using the disclosed tools and techniques. For example, some or all of the model components can communicate with each other in an arbitrary fashion, or some combination of non-pipelined and pipelined architecture can be implemented. Additionally, modular simulation tool 100 can be configured to perform numerous different types of simulations. For example, model components can be selected such that integrated circuit design tool 100 can perform various verification simulations and analyses such as dynamic timing analysis, static timing analysis, timing simulation, behavioral simulation, and functional simulation.

This simulation approach represented by tool 100 utilizes multiple model components/subcomponents having varying levels of system abstraction. At one extreme (the least abstract), model components can be assembled using the exact IP cores, macros, buses, etc. that are available to the designer for final implementation in the target device. While this approach can be used in principle, it may be impractical because of model complexity and the associated simulation time required. Moreover, such a level of detail may be unnecessary for a user's purposes depending on where in the design process the simulation is to be used. A more typical approach is to select higher levels of abstraction for the definition of model components. The precise level of abstraction used will generally depend on a number of factors including, for example, whether the systems are structured or unstructured, the specific application for which the device is intended, the library of available IP blocks, the bus architecture, available simulation resources (e.g., processing power, storage, time) and the like.

While numerous different simulation environments and frameworks can take advantage of the tools and techniques of the present application, those developed for use in electronic design automation (EDA) are particularly relevant. One such example is the SystemC modeling language. SystemC is an emerging standard modeling platform based on C++ and supporting design abstraction at the RTL, behavioral, and system levels. Consisting of a class library and a simulation kernel, the language is an attempt at standardization of a C/C++ design methodology, and is supported by the Open SystemC Initiative (OSCI) (see also http://www.systemc.org), a consortium of a wide range of semiconductor companies, IP core providers, embedded software developers, and design automation tool vendors.

Apart from the modeling benefits inherent in C++ such as data abstraction, modularity, and object orientation, SystemC also establishes a common design environment including C++ libraries, models and tools. This provides a foundation for system level design, hardware-software co-design, the ability to easily and efficiently exchange/reuse IP, and the ability to reuse test benches across different levels of modeling abstraction. In the SystemC simulation methodology, a designer writes the SystemC models at the system level, behavioral level, or RTL level using C/C++ augmented by the SystemC class library. The class library provides the implementation of many types of objects that are hardware-specific, such as concurrent and hierarchical modules, ports, and clocks, and includes a kernel for scheduling the processes. The SystemC code is then compiled and linked together with the class library using any standard C++ compiler, and the resulting executable serves as the simulator of the user's design. Thus, the SystemC environment is well suited to simulation implementations such as that shown in FIG. 1.

Because of SystemC's structure and hierarchy, as well as the fact that SystemC can make use of the sophisticated program development infrastructure already in place for C/C++, many of the tools and techniques of the present application are more readily implementable. SystemC is designed with multiple levels of abstraction in mind. Structural decomposition is one of the fundamental hardware modeling concepts because it helps partition a complex design into smaller entities. In SystemC, structural decomposition is specified with modules, which are the basic building blocks. A SystemC description includes a set of connected modules, each encapsulating some behavior or functionality. Modules can be hierarchical, containing instances of other modules. The nesting of hierarchy can be arbitrarily deep, which is an important requirement for structural design representation. SystemC modules can be connected by using ports (having an associated direction which can be input, output, or bidirectional) and signals, and the interface of modules to the external world can be even more general.

Moreover, the functionality of a system is described in SystemC processes, which are used to represent concurrent behavior, e.g., multiple processes within a module can represent hardware or software blocks executing in parallel. Processes have an associated sensitivity list describing signals that trigger the execution of the process. Additionally, processes are classified as either method processes (behaving like function calls and used to model simple combinational behavior) and thread processes (used to model sequential behavior, and able to be suspended and reactivated. Thus, in many embodiments, SystemC is a suitable simulation platform for implementing tool 100.

Although SystemC provides a useful example of a suitable EDA related modeling platform, other modeling platforms such as SpecC, Esterel, System Verilog, VHDL, and Handel-C can be used. Similarly, numerous other EDA simulation and verification tools can make use of the presently disclosed tools and techniques.

Other simulation techniques having broader applicability beyond EDA can be used. For example, the dynamic component substitution (DCS) simulation methodology as described in "DYNAMIC COMPONENT SUBSTITUTION IN WEB-BASED SIMULATION", by D. M. Rao, and P. A. Wilsey, Proceedings of the 2000 Winter Simulation Conference, Society for Computer Simulation, pages 1840-1848, which is herein incorporated by reference, can implement the tools and techniques of some embodiments of the present invention. DCS techniques have been explored in web-based simulation environments. In such a component based model, a system is represented as a set of interconnected components, each of which is a well defined entity viewed as a "black box", i.e., only its interface is of interest and not its implementation. A component can in turn be specified using a set of other components/subcomponents. During simulation, each atomic component is associated with a specific, well defined software module that implements its behavior and functionality. The software modules could be those implemented by the modeler, available locally, or (in the case of web-based modeling) those obtained via the web from other third party model developers. As noted above, component based modeling techniques offer a number of advantages (reuse, exploration of design alternatives, varying abstraction level, etc.). Although component substitution can be done statically, e.g., prior to simulation, DCS techniques are used to substitute components during the course of simulation.

Still other modeling platforms and schemes can used in conjunction with the tools and techniques of the present application. For example, multi-representation modeling (MRM), where different models of the same, similar, or related phenomena are jointly executed, have been used in a number of different applications from multi-resolution graphics and battlefield simulations to climate models and molecular models. In the simplest case, a multi-model includes two models. If some models are compositions/decompositions or abstractions/refinements of one another, their representation levels (i.e., the level of abstraction of the model) are also called resolution levels or resolutions. An aggregate model is typically a relatively low-resolution (high-abstraction, low-decomposition) model, whereas a disaggregate model is a relatively high-resolution (low-abstraction, high-decomposition) model. The resolution levels form a hierarchy, with the highest level being the most abstract or most aggregate one, and the lowest level being the most refined or most disaggregate one. At various points in the multi-model simulation process, it may be desirable to swap out one or more multi-model components for a component of a different resolution.

One of the functions of hot spot monitor & model control 160 is to monitor the model components to determine when one component should be replaced with another. With traditional hot spot compilation techniques used in runtime systems of complex, interpreted languages such as Java, a hot spot module monitors where the execution cycles are being spent in the program being executed by the interpreter. When a particular function or code segment is seen to be executed for a prescribed duration or frequency, the hot spot module triggers the compilation of the code segment into the native (non-interpreted) instruction set of the execution host. For the purposes of the present application, hot spot monitoring of the simulation is used to identify components that are consuming some simulation resource (e.g., CPU cycles) and are thus "hot". Note that "hot spot" analysis is given its broadest meaning in the present application. Thus, hot spot monitoring can be indirect, including techniques more accurately referred to as "cold spot" monitoring, e.g., identifying model components that are not consuming simulation resources beyond a threshold level.

The steps taken in response to hot spot detection can take a variety of different forms. In general, the detection of a hot spot causes tool 100 to execute part of the simulation at a different level of detail. In some embodiments, a model component that is encountering a hot spot is replaced with a higher fidelity component. In such cases, the conclusion is that the overall simulation can benefit from the more detailed model component. In other embodiments where speed of execution is important, a model component that is encountering a hot spot may instead be replaced with a lower fidelity model component, on the assumption that the lower fidelity model component will consume less simulation resources, thereby allowing the simulation to conclude more quickly. In still other embodiments, model components that are not encountering hot-spots may also be replaced. For example, a simulation can begin with each model component representing the highest level of fidelity. As hot spots are identified, model components that are not encountering hot spots can be replaced with lower fidelity counterparts. Similarly, the simulation can start with low fidelity model components, replacing hot-spot components with higher fidelity components as identified. Still other variations will be understood to those having ordinary skill in the art.

Referring again to FIG. 1, a use case of the module 160 involves detecting one of the pipeline stages running for a disproportionately long time with respect to the others as a result of, for example, some data dependent behavior it is exhibiting in response to the model's input stimulus. Module 160 can use dynamic execution profiling from the host operating system, simulator, or language runtime environment to determine when a part of the model is hot. Additionally, it may instantiate monitors within the model itself to gain further insight into the model's runtime profile. Having detected a hot spot, module 160 essentially changes the virtual multiplexers to cause a more detailed version of the model component to execute subsequent input data. A context switch will typically be necessary to propagate the state of the previously executing model component into the newly selected component. This operation can be optimized, for example, by allowing the model or relevant model component to continue to run until it reaches a point where there is little or no state that needs to be exchanged. Thus the general goal is to ensure that in the simulation time that follows the context switch, the components being used most frequently are executed at the best available fidelity.

Again, numerous different techniques can be used for hot spot monitoring, and those techniques can be implemented at various system levels, e.g., in the hardware, at the operating system level, or at the simulation level.

Hot spots in the execution of model code can be dynamically determined during tracing of the execution of the code. For example, in a hot spot, a portion of code is either executed many times compared to other portions of the code, a portion of code consumes a large amount of processing cycles compared to other portions of code, or the like. Such tracing can be statistical in nature or exact. For example, the Unix prof command, which samples the program counter during program execution, provides a statistical hot spot analysis tool. A similar, but more sophisticated, tool is AIX's tprof, which also samples the system program counter and reports CPU usage for individual programs and the system as a whole. Tprof can charge CPU time to object files, processes, threads, subroutines (user mode, kernel mode, and shared library) and even to source lines of programs or individual instructions. Charging CPU time to subroutines is often referred to as profiling and charging CPU time to source program lines is often referred to as micro-profiling. For subroutine-level profiling, the tprof command can be run without modifying executable programs, that is no recompilation with special compiler flags is necessary. However, recompilation is generally required to obtain a micro-profile.

With prof, tprof, or other sampling based tracing mechanisms (e.g., gprof, vprof, eprof), when a sample occurs, the instrumentation software identifies the address of the interrupted routine. The address is used to access a table, where the count for that address is incremented. Hash tables can be used to maintain the table of addresses. In some cases, where the range of addresses tends to be small, an index into a table may be constructed from the address. For each address identified by sampling, a count of occurrences at those addresses is maintained. It is this count of occurrences that is used to identify hot spots in the execution of the program.

Other software techniques rely on code instrumentation, where code is inserted into a program, and the modified program is executed. Such techniques can be exact (or at least more complete), and are frequently used for both profiling (e.g., counting the number of times that each basic block in a program executes) and program tracing (e.g., recording the sequence of basic blocks traversed in a program execution). The program qpt is a well known example of an exact and efficient program profiler and tracing system. It rewrites a program's executable file by inserting code to record the execution frequency or sequence of every basic block (e.g., straight-line sequence of instructions) or control-flow edge. Another program (qpt_stats) uses this information to calculate the execution cost of procedures in the program. Unlike prof, tprof, and gprof, qpt records exact execution frequency, not a statistical sample.

Some hardware-centric techniques focus on so-called "hot paths," i.e., traces within a program, often contained in loops, that are executed numerous times or at least more than some threshold value. Hot path detection can be based upon a structure of hardware counters, which keep track of how many times certain individual code fragments are executed. The counter structure can be implemented as an associative cache, meaning that its identifying tag is simply the program counter (PC) value of the beginning instruction of the fragment. Each entry, or counter, also contains the number of times that the instruction at that PC has been executed. For each cycle, the processor sends the current PC to the counter structure, and the counters update themselves, using their own comparators and adders. If the PC matches a particular counter, that counter simply adds 1 to its current total. When a counter reaches a particular threshold, that area of the program is considered hot, and at that point other analysis, such as speculative profiling can be performed.

Still other hardware-centric monitoring techniques can be used. For example, the hot spot detector disclosed in U.S. Pat. No. 6,681,387 includes a branch behavior buffer, a refresh timer, a reset timer, and a hot spot detection counter. The branch behavior buffer stores information related to branch instruction address, branch execution counter, branch taken counter, branch candidate flag and a valid entry bit. The branch behavior buffer is used to track branch instructions which are retired. Frequently executed branch instruction addresses within a particular interval are designated as hot spot candidates. The hot spot detection counter is used to track non-hot spot branches and hot spot candidate branches. When hot spot candidate branches are frequently encountered compared to non-hot spot candidate branches, the hot spot detector may notify some other process (e.g., an operating system) and hot spot candidate branch addresses may be supplied to a hot spot monitor such as module 160.

Numerous other examples of hot spot detection can be found in software and hardware based dynamic optimization techniques. Moreover, the simulation environment can allow for less formal hot spot analysis. For example, model component features such as data throughput, amount of simulation (as opposed to real) time consumed, and data transfer latencies between components can provide information relevant to hot spot analysis. Moreover, certain simulated activities (or the frequency thereof), such as bus transactions, requests for arbitration, message passing, etc., can provide adequate information to determine hot spots. In general, a variety of different hot spot detection techniques will be known to those having ordinary skill in the art.

Model component replacement can be triggered by certain types of activity, or certain levels of activity. As noted above, threshold values are typically compared with relevant measured hot spot (or cold spot) values to determine if action should be taken. Thus, activity will depend on the threshold values used as well as the nature of the comparison (e.g., greater than or less than). In some embodiments, hysteresis can be employed. More specifically, the threshold value in one direction (e.g., hot to cold) can be different from the threshold value in the other direction (cold to hot). This might be useful, for example, to reduce or eliminate model component thrashing, i.e., the repeated swapping of two model components.

Hot spot monitor & model control module 160 is illustrated as a single software entity. However, this module, and indeed any of the software modules described herein, can be variously fragmented into multiple modules, implemented on separate computer systems, executed as separate threads on a single computer system, etc. Thus, the organization of the functional blocks and the hardware on which corresponding software is executed can be implemented in a variety of different ways as is well known in the art. In general, two or more of the various modules can execute on the same computer system, or on some combination of separate computer systems as desired. The types of computer systems on which such software can be implemented are described below in conjunction with FIG. 4.

Figure 2:
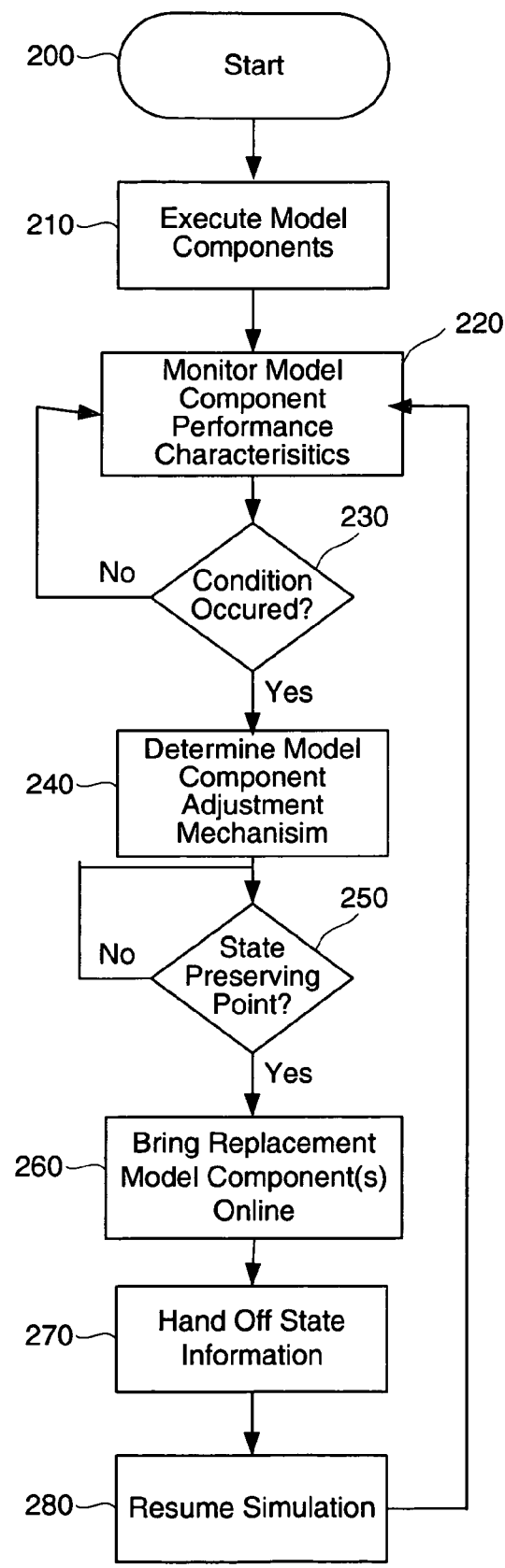
FIG. 2 is a simplified flow diagram illustrating some techniques of the present invention.

FIG. 2 is a simplified flow diagram illustrating one embodiment of the hot spot monitoring and dynamic variation of the level of model detail during the simulation of a system model. Operation begins at 200 where the existence of one or more model components is assumed. These model components are typically precompiled or described in a language that can be compiled or interpreted by a corresponding tool.

Model components are executed at 210. As noted above, the model components selected for initial execution can depend on the strategy used for monitoring the simulation and dynamically varying model component fidelity. Consequently, all of the initial model components executed might represent highest fidelity components, lowest fidelity components, or some combination of the two. In most cases, initially executed model components will be selected based on their level of fidelity, but in some embodiments it may be desirable to randomly select model components corresponding to each model component.

As the model components are executing, one or more performance characteristics of some or all of them are monitored. As discussed above, the monitoring typically takes the form of monitoring for hot spots (and/or cold spots) either directly or indirectly. Thus, the monitoring might include active examination of model component performance, or it may simply include evaluating reports from the components that related to one or more performance characteristics.

Next in step 230, it is determined whether a monitored-for condition has occurred. This test is typically performed by comparing some component performance characteristic against one or more threshold values. There can be multiple different tests that are performed for any one component, any one of which might trigger component replacement. In more sophisticated embodiments, this process can include multiple tests (e.g., either in parallel or contingent upon each other) that have to be performed against monitored performance characteristics before a component substitution is triggered. If no monitored condition occurs, operation loops back to 220. If instead a monitored condition is detected, operation transitions to 240.

In step 240, one or more component adjustment mechanisms are selected as a reaction to the monitored event. The adjustment typically includes replacement of at least one model component with another model component representing the same or similar functionality and having a different level of fidelity. As described above, the adjustment mechanism can include a variety of techniques such as: replacing a model component encountering a hot spot with a higher fidelity model component, replacing a model component encountering a hot spot with a lower fidelity model component, replacing one or more model components surrounding a model component encountering a hot spot with higher/lower fidelity model components, and the like. In general, the particular mechanism used to adjust model components will typically be determined before model execution, and so there may be no need for a separate determination such as 240. However, in some embodiments, the mechanism can be user selectable or dynamically determined during the course of simulation based on other criteria (e.g., best model performance improvement, thrashing avoidance, ease of swapping, etc.).

Once a technique is determined, the process monitors the effected component(s) to determine if they are at a state preserving point (250). In some embodiments, this can include an operation where the model component is informed of the need to preserve state information or to stop at a point in its execution where state is minimized. In response, the model component can pass a corresponding message back to a monitoring entity, take steps to prepare for a context switch, come to execution halt at predefined "switch" points, and/or preserve state information in a suitable record that can be used by the replacement model component. The precise manner in which state is preserved (and thus the manner in which determination 250 is made) can also vary from component to component.

State preservation requirements can vary with implemented algorithms and functionality being simulated, so it may be necessary to use numerous different state preserving techniques. Moreover, any one model component can have multiple different state preserving techniques at its disposal. For example, different techniques might be useful if it is determined that the time period of hot spot occurrences (e.g., the hot spot window) is sufficiently mismatched with the speed at which model components can be replaced. In such a situation, a state preserving technique might be selected that is quicker than others, even if some relevant information is lost. In some embodiments, e.g., where a higher fidelity model component is being replaced by a lower fidelity component, the available state information may be greater than is useful for the replacement model component. Thus, the process of coming to a state preserving point can also include data translation, or as will be seen below, this can be a separate operation.

If no state preserving point has been reached, operation remains in a loop associated with step 250. Once a state preserving point has been reached, operation transitions to 260. Note that other steps (not shown) related to operations on un-swapped model components can also be performed. For example, it may be desirable, to temporarily suspend the execution of some or all model components to accommodate the replacement of the target components. Replacement model components are brought online in 260. As will be well known to those having skill in the art, this process can include numerous steps such as instantiating objects, compiling code, initializing model features, taking the replaced model components offline, and the like. In some embodiments, step 260 is eased by already having the replacement model components executing. Thus, the process of bringing the replacement model components online merely requires taking steps to redirect information flow to/from the replaced model components from/to the replacement model components.

Once the replacement model components are online, state information is handed off to the new components. This process will typically vary with the method of state preservation used, as described above. Finally, the simulation resumes (including resuming execution of any paused model components) at 280, and operation transitions back to 220.

The flow chart of FIG. 2 illustrates some of the many operational examples of model component monitoring and replacement disclosed in the present application. Those having ordinary skill in the art will readily recognize that certain steps or operations illustrated in FIG. 2 can be eliminated or taken in an alternate order. Moreover, the methods described in FIG. 2 are typically implemented as one or more software programs encoded in a computer readable medium as instructions executable on a processor. The computer readable medium can be any one of an electronic storage medium, a magnetic storage medium, an optical storage medium, and a communications medium conveying signals encoding the instructions. Separate instances of these programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

Figure 3:
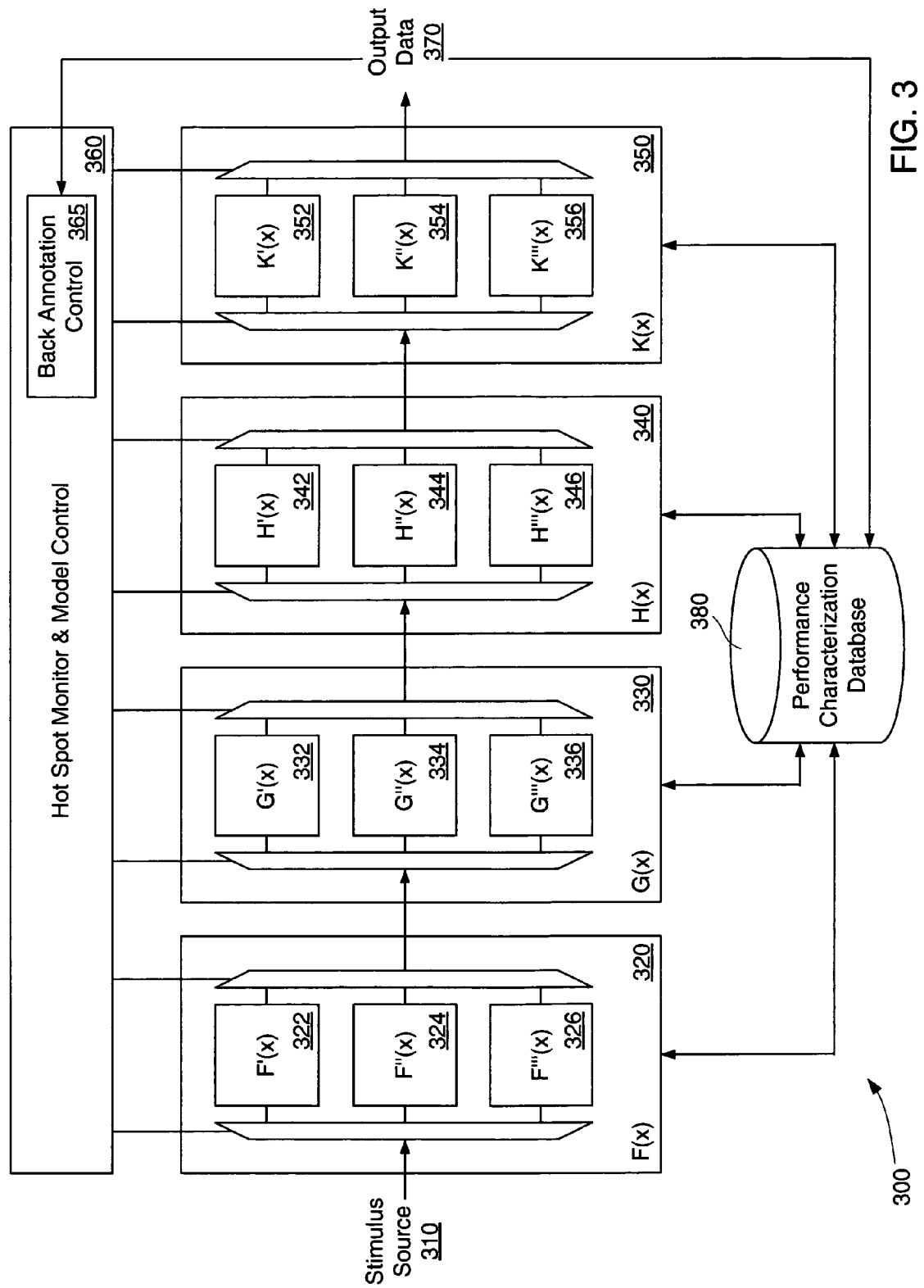
FIG. 3 is a simplified block diagram illustrating another modeling environment for use in system level design of integrated circuits.

FIG. 3 is a simplified block diagram illustrating another embodiment of a modeling environment for use in system level design. Modular simulation tool 300 performs system level design simulation using model components 320-350, and is similar to modular simulation tool 100 shown in FIG. 1. Each of the constituent model components 320-350 of the model have themselves been modeled to multiple levels of detail, as represented by the various model subcomponents illustrated (322-326, 332-336, 342-346, 352-356).

However, since the performance analysis provided in conjunction with hot spot monitor & model control 360 can provide information useful to other aspects of the design process, modular simulation tool 300 includes additional features such as back annotation control 365 and performance characterization database 380. In general, back annotation is the process of extracting specific types of data from a design representation and transporting it back to other representations of the design or library for iterative use in earlier steps of the design flow. For example, path delays from a nearly finished design layout are often back-annotated for use by simulation tools to achieve accurate post-layout verification. In some design flows, back-annotation is simply the translation of a routed or fitted design to a timing simulation netlist.

In modular simulation tool 300, back annotation can play an important role in the hot spot aware simulator. The reach of hot spot analysis is extended to note when the performance analysis data reported out by the model components reaches a steady state. At that point, the performance data from the component can be captured (e.g., cached) and used to populate characterization database 380 for use by versions of model components at higher levels of abstraction. With that information available, the simulation can return to executing a model component with a less detailed version (and receive a corresponding increase in simulation performance). However, the back annotation data can be accessed and used by the replacement model component. Periodic revalidation of the data in characterization database 380 may be desirable to determine whether the data it contains is still valid in the current execution context. When the data is found to be invalid, module 360 can be forced to swap in a more detailed model component to, effectively, dynamically re-characterize the component's performance. As shown in FIG. 3, operation of the back annotation process and model access to the database is controlled by back annotation control 365.

Figure 4:
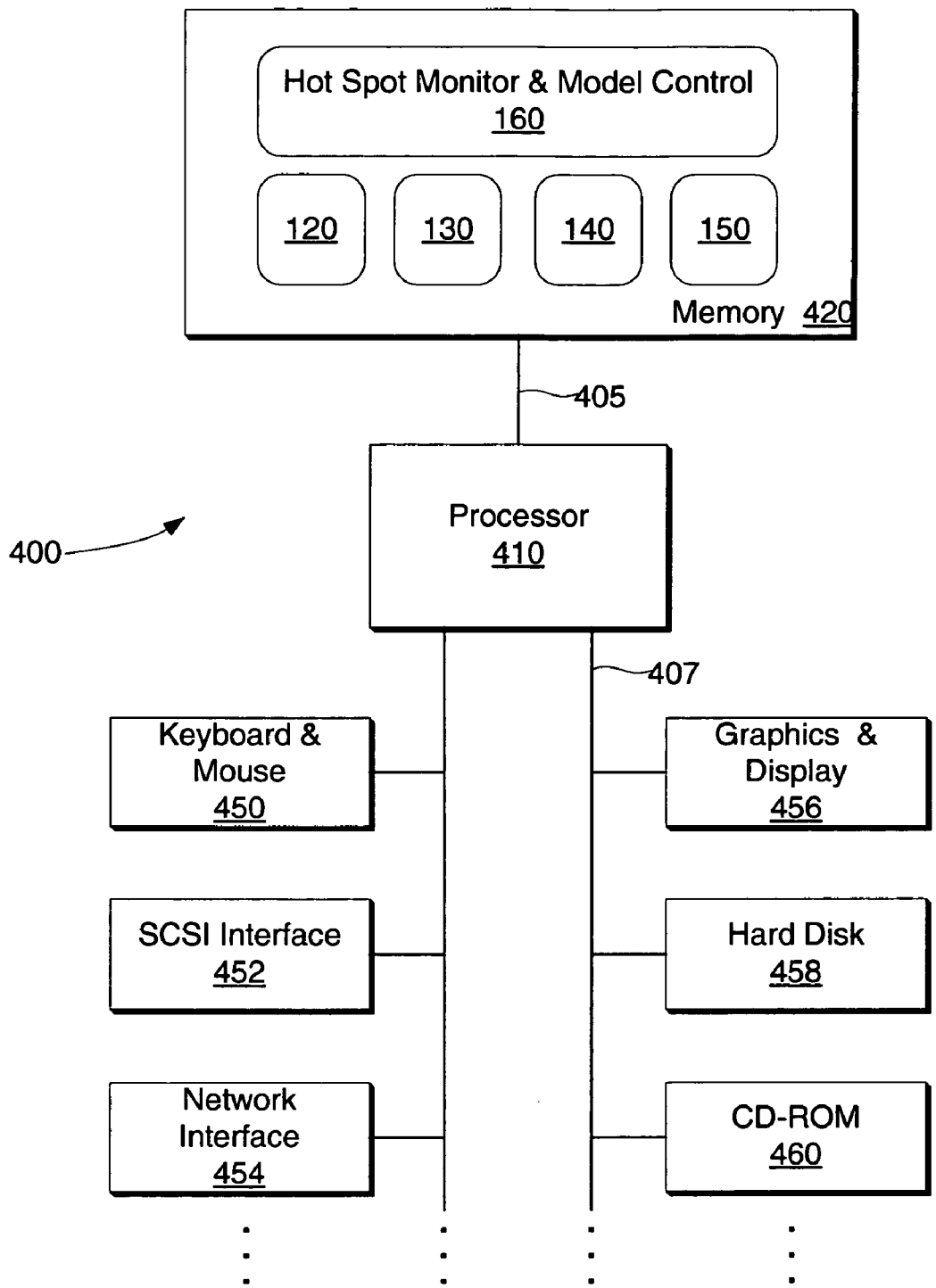
FIG. 4 is a block diagram of a computer system for implementing the techniques of the present invention.

FIG. 4 illustrates a block diagram of a computer system 400 for implementing the techniques for multiplexer mapping of the present invention. For example, computer system 400 is typically an EDA workstation used as part of the circuit design process. Computer system 400 includes a processor 410 and a memory 420 coupled together by communications bus 405. Processor 410 can be a single processor or a number of individual processors working together. Memory 420 is typically random access memory (RAM), or some other dynamic storage device, and is capable of storing instructions to be executed by the processor, e.g., hot spot monitor and model control 160, simulation model components 120-150, etc. Memory 420 is also used for storing temporary variables or other intermediate information during the execution of instructions by the processor 410.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 120-160 can be provided to the computer system via a variety of computer readable media including electronic media (e.g., flash memory), magnetic storage media (e.g., hard disk 458, a floppy disk, etc.), optical storage media (e.g., CD-ROM 460), and communications media conveying signals encoding the instructions (e.g., via a network coupled to network interface 454).

Computer system 400 also includes devices such as keyboard & mouse 450, SCSI interface 452, network interface 454, graphics & display 456, hard disk 458, and CD-ROM 460, all of which are coupled to processor 410 by communications bus 407. It will be apparent to those having ordinary skill in the art that computer system 400 can also include numerous elements not shown in the figure, such as additional storage devices, communications devices, input devices, and output devices, as illustrated by the ellipsis shown.

The systems, methods, software, and techniques disclosed herein for model component monitoring and replacement have emphasized applications targeting system level design which may implicate certain types of target devices, e.g., FPGAs and ASICs. However, those having ordinary skill in the art will readily recognize that the same techniques can be used in numerous different types of integrated circuit design, as well as in modeling environments unrelated to integrated circuit design.

Although the present invention has been described with respect to a specific preferred embodiment thereof, various changes and modifications may be suggested to one skilled in the art and it is intended that the present invention encompass such changes and modifications that fall within the scope of the appended claims.

The invention claimed is:

1. A method comprising:
   providing a model component corresponding to a simulation task;
   executing the model component as part of the simulation task during a simulation;
   monitoring a performance characteristic of the model component during the simulation;
   selectively replacing, during the simulation, the model component, another executing model component or a combination thereof with a replacement model component according to the monitoring of the performance characteristic of the model component; and
   storing the replacement model component within a computer readable medium.

2. The method of claim 1 wherein the replacement model component is a higher fidelity model component than the model component, another executing model component or a combination thereof, or a lower fidelity model component than the model component, another executing model component or a combination thereof.

3. The method of claim 1 wherein the replacement model component is substantially functionally equivalent to the model component, another executing model component or a combination thereof.

4. The method of claim 1 wherein the simulation task further comprises:
   dynamic timing analysis of an integrated circuit design;
   static timing analysis of an integrated circuit design;
   timing simulation of an integrated circuit design;
   behavioral simulation of an integrated circuit design;
   or a combination thereof.

5. The method of claim 1 wherein the performance characteristic includes:
   simulation resource consumption;
   process execution information;
   thread execution information;
   subroutine execution information;
   simulation time information;
   model component data throughput;
   program counter information;
   or a combination thereof.

6. The method of claim 1 wherein the monitoring the performance characteristic of the model component further comprises:
   performing hardware based hot spot analysis;
   performing software based hot spot analysis;
   or a combination thereof.

7. The method of claim 1 further comprising:
   preserving state information corresponding to the model component, the another executing model component or a combination thereof; and
   providing the state information to the replacement model component.

8. The method of claim 1 further comprising:
   determining a model component replacement strategy; and
   performing the selectively replacing according to the model component replacement strategy.

9. The method of claim 1 further comprising:
   storing performance data corresponding to at least one of the model component, the another executing model component, and the replacement model component in a characterization database;
   wherein the performance data can be used by a corresponding model component having a different level of abstraction.

10. The method of claim 9 further comprising:
    re-executing the at least one of the model component, the another executing model component, and the replacement model component to determine whether the performance data is still valid.

11. A system comprising:
    a memory;
    a processor coupled to the memory; and
    a modular simulation tool, wherein at least a portion of the modular simulation tool is encoded as instructions stored in the memory and executable on the processor, and wherein the modular simulation tool is configured to:
      monitor a performance characteristic of a model component during a simulation; and
      selectively replace the model component with a replacement model component, during the simulation, based on the monitored performance characteristic of the model component.

12. The system of claim 11 wherein the replacement model component is one of: a higher fidelity model component than the model component, or a lower fidelity model component than the model component.

13. The system of claim 11 wherein the replacement model component is substantially functionally equivalent to the model component.

14. The system of claim 11 wherein the model component implements a simulation task, and wherein the simulation task further comprises:
    dynamic timing analysis of an integrated circuit design;
    static timing analysis of an integrated circuit design;
    timing simulation of an integrated circuit design;

behavioral simulation of an integrated circuit design; or a combination thereof.

15. The system of claim 11 wherein the performance characteristic includes:
   simulation resource consumption;
   process execution information;
   thread execution information;
   subroutine execution information;
   simulation time information;
   model component data throughput;
   program counter information;
   or a combination thereof.

16. The system of claim 11 wherein the modular simulation tool is further configured to:
   perform hardware based hot spot analysis;
   perform software based hot spot analysis;
   or a combination thereof.

17. An apparatus comprising:
   a means for executing a model component as part of a simulation task during a simulation;
   a means for monitoring a performance characteristic of the model component during the simulation; and
   a means for selectively replacing at least one of the model component or another executing model component with a replacement model component, during the simulation, according to the monitoring of the performance characteristic of the model component.

18. The apparatus of claim 17 further comprising:
   a means for preserving state information corresponding to the at least one of the model component and the another executing model component; and
   a means for providing the state information to the replacement model component.

19. The apparatus of claim 17 further comprising:
   a means for determining a model component replacement strategy; and
   a means for controlling the means for selectively replacing according to the model component replacement strategy.

* * * * *